US011263350B2

(12) United States Patent
Monji et al.

(10) Patent No.: US 11,263,350 B2
(45) Date of Patent: Mar. 1, 2022

(54) CRYPTOGRAPHIC APPARATUS AND SELF-TEST METHOD OF CRYPTOGRAPHIC APPARATUS

(71) Applicant: Hitachi, Ltd., Tokyo (JP)

(72) Inventors: Hideaki Monji, Tokyo (JP); Yuusaku Kiyota, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/019,433

(22) Filed: Sep. 14, 2020

(65) Prior Publication Data

US 2021/0279371 A1    Sep. 9, 2021

(30) Foreign Application Priority Data

Mar. 3, 2020  (JP) .............................. JP2020-036110

(51) Int. Cl.
*G06F 21/64* (2013.01)
*G06F 21/60* (2013.01)

(52) U.S. Cl.
CPC ............ *G06F 21/64* (2013.01); *G06F 21/602* (2013.01)

(58) Field of Classification Search
CPC ....... G06F 21/64; G06F 21/602; G06F 21/575
See application file for complete search history.

(56) References Cited

U.S. PATENT DOCUMENTS

| | | | | |
|---|---|---|---|---|
| 6,175,934 B1* | 1/2001 | Hershey | .............. | G06F 11/2294 700/177 |
| 2003/0084350 A1* | 5/2003 | Eibach | .................... | H04L 63/08 726/4 |
| 2004/0133516 A1* | 7/2004 | Buchanan | .......... | G06Q 20/1085 705/42 |
| 2005/0021466 A1* | 1/2005 | Buchanan | .............. | G06Q 20/20 705/42 |
| 2007/0107042 A1* | 5/2007 | Corona | .................... | G06F 21/34 726/2 |
| 2012/0069995 A1* | 3/2012 | Matthews, Jr. | ......... | G06F 21/78 380/44 |
| 2016/0112456 A1* | 4/2016 | Pearson | .............. | H04L 63/0876 713/170 |

FOREIGN PATENT DOCUMENTS

JP    2011-082566 A    4/2011

* cited by examiner

*Primary Examiner* — Abiy Getachew
(74) *Attorney, Agent, or Firm* — Mattingly & Malur, PC

(57) ABSTRACT

In a cryptographic apparatus, a cryptographic module executes first assurance check processing, which is processing for satisfying a predetermined certification requirement on image data of first software, and also executes second assurance check processing, which is processing for satisfying the above predetermined certification requirement on a verification target, which is at least part of image data of second software, and on which verification for satisfying the predetermined certification requirement is not performed by a device.

9 Claims, 4 Drawing Sheets

US 11,263,350 B2

CRYPTOGRAPHIC APPARATUS AND SELF-TEST METHOD OF CRYPTOGRAPHIC APPARATUS

CROSS-REFERENCE TO PRIOR APPLICATION

This application relates to and claims the benefit of priority from Japanese Patent Application Number 2020-36110, filed on Mar. 3, 2020 the entire disclosure of which is incorporated herein by reference.

BACKGROUND

The present invention generally relates to a self-test of a cryptographic apparatus.

It is known that a security requirement relating to a cryptographic apparatus is prescribed, and, with the cryptographic apparatus satisfying the security requirement, certification for the security requirement can be obtained. An example of the certification that can be obtained includes federal information processing standards (FIPS) certification (e.g., FIPS 140).

One security requirement for obtaining FIPS 140 certification is that the cryptographic apparatus itself performs a test serving as an FIPS 140 certification requirement, i.e., a self-test (hereinafter referred to as an FIPS self-test) serving as the FIPS 140 certification requirement.

A technique relating to the self-test is disclosed in Reference 1. In a semiconductor apparatus disclosed in Reference 1, a processing device performs a test of a programmable device, and the processing device performs a test of a memory device by using a built-in self-test circuit implemented in the programmable device.

Reference 1: JP2011-82566

SUMMARY

As the test serving as the FIPS 140 certification requirement, there is a test for verifying image data of software and firmware executed in a cryptographic apparatus according to a predetermined requirement.

FIPS 140 certification has several levels. Depending on the level, the size of a cryptographic boundary (an area in which a security requirement has to be satisfied) or restriction which has to be satisfied in the cryptographic boundary differs. In order to obtain FIPS 140 certification, the FIPS self-test has to be performed on each device present in the cryptographic boundary corresponding to a level desired by a user.

When the level is increased, the size of the cryptographic boundary can be increased. For example, when the level of FIPS 140 certification is Level 1, the cryptographic boundary may be part of the cryptographic apparatus. However, when the level of FIPS 140 certification is Level 2, the cryptographic boundary is the entire cryptographic apparatus.

All devices in the cryptographic apparatus do not necessarily have the function of performing the FIPS self-test. For example, it is conceivable to employ a method of implementing a cryptographic apparatus by implementing, on a circuit board, on which a device provided by a vendor different from a cryptographic apparatus vendor to execute predetermined software is already disposed, a cryptographic module that executes another software. In such a cryptographic apparatus, the above-described existing device on the circuit board does not necessarily have the function of performing the FIPS self-test including verification of the software executed by the existing device.

According to Reference 1, in the semiconductor apparatus, the test of the programmable device and the test of the memory device are performed by the processing device, and the semiconductor apparatus disclosed in Reference 1 is not an apparatus in which a plurality of devices which execute different pieces of software (e.g., a device X which executes software A and a device Y which executes software B, which is different from the software A) are mixed. Therefore, Reference 1 does not have the following problem, i.e., a problem whereby, while a plurality of devices which execute different pieces of software are present in an apparatus, in a case where part of the devices does not have an FIPS self-test function (the function of performing the FIPS self-test including verification of image data of software performed according to a predetermined requirement), it is not possible to set the apparatus as the cryptographic boundary. Consequently, it is not possible to solve the problem based on Reference 1.

Such a problem can exist in certification other than FIPS 140 certification.

A cryptographic apparatus receiving encryption-target data and encrypting the data is provided, which includes a first storage area in which image data of first software is stored, a cryptographic module which encrypts data by executing the first software, a second storage area in which image data of second software is stored, and a device which executes predetermined processing by executing the second software. The cryptographic module executes first assurance check processing, which is processing for satisfying a predetermined certification requirement, on the image data of the first software. The cryptographic module executes second assurance check processing, which is processing for satisfying the predetermined certification requirement, on a verification target which is at least part of the image data of the second software and on which verification for satisfying the predetermined certification requirement is not performed by the device.

According to the present invention, even when the device which executes the second software different from the first software executed by the cryptographic module does not have the function of performing the self-test including the verification of the image data of the second software, it is possible to set the entire cryptographic apparatus as the cryptographic boundary.

DESCRIPTION OF EMBODIMENTS

Figure 1:
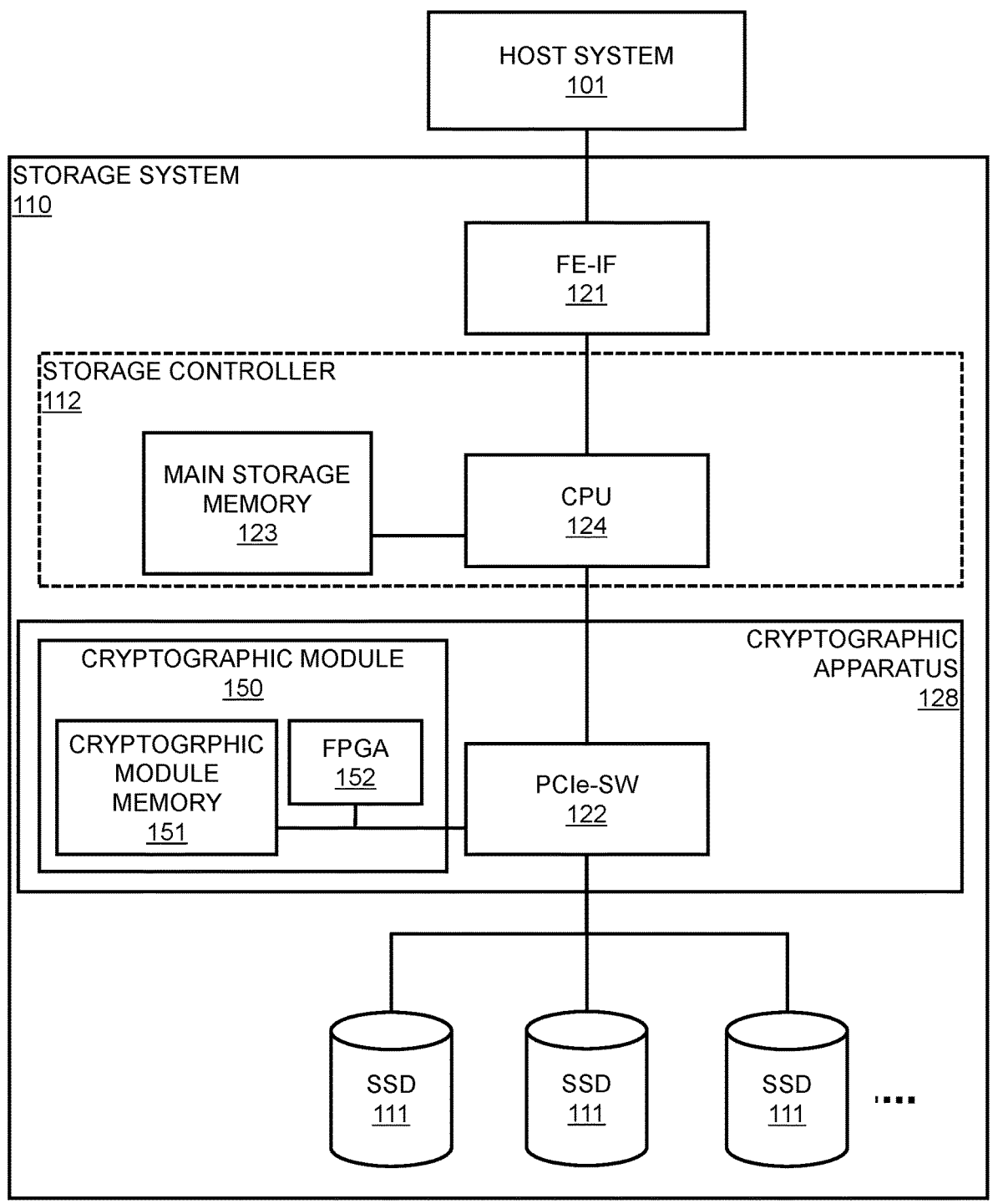
FIG. 1 shows the configuration of an entire system including a storage system having a cryptographic apparatus according to an embodiment.

Hereinbelow, an embodiment will be described. Note that, in the following description, there are cases where common parts of reference numerals are used when elements of the same type are described without being distinguished from each other, and reference numerals are used when the elements of the same type are distinguished from each other. For example, there are cases where PCIe ports are referred to as "PCIe ports 411" when PCIe ports are not distinguished from each other, and PCIe ports are referred to as a "PCIe port 411A" and a "PCIe port 411B" when PCIe ports are distinguished from each other.

FIG. 1 shows the configuration of an entire system including a storage system having a cryptographic apparatus according to the embodiment.

A storage system 110 has a plurality of (or one) SSDs 111, a FE-IF (front-end interface apparatus) 121 to which a host system 101 is coupled, a cryptographic apparatus 128 to which the plurality of SSDs 111 are coupled, and a storage controller 112 coupled to the FE-IF 121 and the cryptographic apparatus 128. The cryptographic apparatus 128 has a PCIe-SW 122 to which the plurality of (or one) SSDs 111 are coupled, and a cryptographic module 150 coupled to the PCIe-SW 122. The storage controller 112 has a main storage memory 123 and a CPU 124.

The SSD 111 is an example of a persistent storage device. A persistent storage device of another type (e.g., a hard disk drive (HDD)) may also be used instead of at least one SSD 111. Note that the "persistent storage device" may typically be a non-volatile storage device (e.g., an auxiliary storage device).

The FE-IF 121 is what is called a front end which receives an I/O request (Input/Output) (e.g., a write request or a read request) from the host system 101. The host system 101 is a physical computer system in the present embodiment, but the host system 101 may also be a system (e.g., a virtual machine) implemented on a computational resource group (a plurality of types of computational resources) inside or outside the storage system 110.

The cryptographic apparatus 128 corresponds to a BE-IF (back-end interface apparatus) in the present embodiment. The cryptographic apparatus 128 has the PCIe-SW (PCIe switch) 122 to which the plurality of (or one) SSDs 111 are coupled, and the cryptographic module 150 coupled to the PCIe-SW 122. The cryptographic module 150 has a cryptographic module memory 151 and a field-programmable gate array (FPGA) 152. The cryptographic module memory 151 is an example of a memory. The memory may be a volatile memory or a non-volatile memory. The FPGA 152 is an example of a device. A device such as an ASIC which is not programmable may also be used instead of the FPGA 152. The PCIe-SW 122 relays data transfer between the SSD 111 and the cryptographic module 150 and data transfer between the cryptographic module 150 and the storage controller 112. An interface device of another type such as, e.g., a serial attached SCSI (SAS) controller may also be used instead of the PCIe-SW 122.

The storage controller 112 has the main storage memory 123 and the CPU 124. The main storage memory 123 is an example of a memory. The memory may be a volatile memory or a non-volatile memory. The CPU 124 is an example of a processor. The FE-IF 121, the cryptographic apparatus 128, and the main storage memory 123 are coupled to the CPU 124.

The CPU 124 reads and writes I/O-target data from and into the SSD 111 in response to the I/O request. At this point, the CPU 124 requests the cryptographic module 150 to encrypt or decrypt the I/O-target data. In response to the request, the cryptographic module 150 encrypts or decrypts the I/O-target data.

For example, the CPU 124 manages a cryptographic key. The cryptographic key may be a shared key or may differ for each predetermined unit (e.g., for each logical volume provided by the CPU 124, for each logical address range of the logical volume, for each SSD 111, or for each logical address of the SSD 111). The cryptographic key may be stored in the main storage memory 123. In the case where the I/O request is the write request, for example, the following write processing is performed. That is, the CPU 124 caches write-target data (plaintext) in the main storage memory 123. The CPU 124 transmits an encryption instruction which specifies that the write-target data (plaintext) in the main storage memory 123 is encrypted and written into the cryptographic module memory 151 to the cryptographic apparatus 128. A cryptographic key used for encryption is associated with the encryption instruction by the CPU 124. In the cryptographic apparatus 128, in response to the encryption instruction, the FPGA 152 encrypts the write-target data specified by the encryption instruction by using the cryptographic key associated with the encryption instruction in the process of transferring the write-target data from the main storage memory 123 to the cryptographic module memory 151, and the write-target data is cached in the cryptographic module memory 151. The encrypted write-target data (ciphertext) is written into (transferred to) the SSD 111 serving as a write destination by at least one of the CPU 124, the FPGA 152, and the SSD 111 serving as the write destination (e.g., the ciphertext is DMA-transferred to the SSD 111 serving as the write destination by the SSD 111 having received a write instruction from the CPU 124). Note that, in the write processing, at least one of the transfer of the write-target data (plaintext) from the main storage memory 123 to the cryptographic module memory 151 and the transfer of the write-target data (ciphertext) from the cryptographic module memory 151 to the SSD 111 may be direct memory access (DMA) transfer. The FPGA 152 may function as a DMA controller. For example, in the write instruction, the CPU 124 may specify encryption, an address of an area in which encryption-target data is cached, and an address of a transfer destination of the data (an address of the cryptographic module 151). The FPGA 152 may perform the DMA transfer of the data (plaintext) from the main storage memory 123 to the cryptographic module memory 151 in response to the write instruction. In addition, the FPGA 152 or the SSD 111 may perform the transfer of the data (ciphertext) from the cryptographic module memory 151 to the SSD 111.

In the case where the I/O request is the read request, for example, the following read processing is performed. That is, the CPU 124 transmits a read instruction which specifies that read-target data (ciphertext) is read from the SSD 111 to the cryptographic apparatus 128. In response to the read instruction, the read-target data (ciphertext) is read into (transferred to) the cryptographic module memory 151 from the SSD 111 by at least one of the CPU 124, the FPGA 152, and the SSD 111 (e.g., the ciphertext is DMA-transferred to the cryptographic module memory 151 serving as the write destination by the SSD 111 having received the read instruction from the CPU 124). Thereafter, the CPU 124 transmits a decryption instruction for the ciphertext transferred to the cryptographic module memory 151 to the cryptographic apparatus 128. The cryptographic key used for decryption (i.e., the cryptographic key used for encryption of the read-target data) is associated with the decryption instruction by the CPU 124. The FPGA 152 decrypts the read-target data (ciphertext) cached in the cryptographic module memory 151 by using the cryptographic key associated with the decryption instruction. The FPGA 152 returns the decrypted read-target data (plaintext) as a response to the decryption instruction. The returned read-target data (plaintext) is cached in the main storage memory 123. The CPU 124 returns the read-target data (plaintext) cached in the main storage memory 123 as a response to the read request. In the read processing described above, at least one of the transfer of the read-target data (ciphertext) from the SSD 111 to the cryptographic module memory 151 and the transfer of the read-target data (plaintext) from the cryptographic module memory 151 to the main storage memory 123 may be the DMA transfer. The FPGA 152 may function as the DMA controller.

Thus, in the present embodiment, the storage system 110 has a cryptographic function of encrypting and decrypting the I/O-target data.

It is conceivable that, instead of the cryptographic apparatus 128 corresponding to the BE-IF, the SSD 111 or the CPU 124 has the cryptographic function.

However, when the SSD 111 has the cryptographic function, it follows that the SSD 111 has the cryptographic key for performing the encryption and decryption of data in the SSD 111. Consequently, when only the SSD 111 has the cryptographic function, in the case where the SSD 111 is stolen, the cryptographic key is also stolen together with the SSD 111, and data can be decrypted by using the stolen cryptographic key. As a result, it is feared that the data will be leaked.

Alternatively, when the CPU 124 has the cryptographic function, the load of the CPU 124 is increased and, as a result, it is feared that I/O performance will be reduced.

For these reasons, there is an advantage in causing the cryptographic apparatus 128 to serve as the BE-IF and have the cryptographic function.

Figure 2:
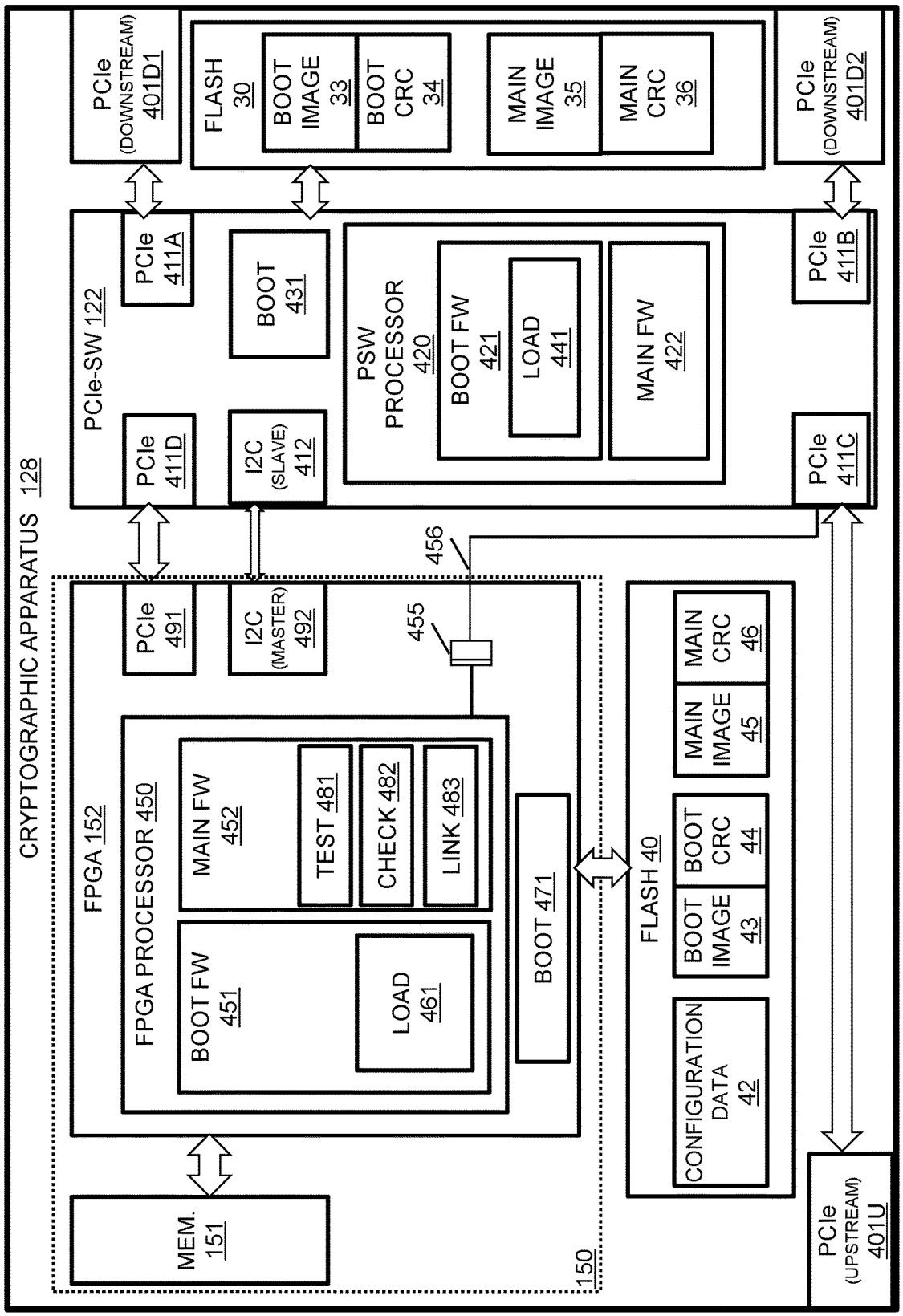
FIG. 2 shows the configuration of the cryptographic apparatus.

FIG. 2 shows the configuration of the cryptographic apparatus 128.

The cryptographic apparatus 128 has a plurality of PCIe ports 401, a first flash memory 40, a second flash memory 30, and a device reset line 456 in addition to the PCIe-SW 122 and the cryptographic module 150. The PCIe-SW 122 is an example of a device. The PCIe port 401 is an example of an apparatus port. The first flash memory 40 is an example of a first storage area. The second flash memory 30 is an example of a second storage area. The first storage area and the second storage area may be provided on the same memory, or may also be provided on separate memories. Each of the first storage area and the second storage area may be typically a non-volatile area.

The PCIe-SW 122 has a plurality of PCIe ports 411 (e.g., four PCIe ports 411A to 411D), a I2C port 412 (slave), a boot control section 431, and a PSW processor 420. The PCIe port 411 is an example of a device port. The boot control section 431 may be, e.g., a hardware circuit or a microcomputer. The PSW processor 420 is a processor (e.g., a central processing unit (CPU)) of the PCIe-SW 122.

The cryptographic module 150 has the cryptographic module memory 151 and the FPGA 152. The FPGA 152 has a PCIe port 491, a I2C port 492 (master), a boot control section 471, an FPGA processor 450, and a link control register 455. The PCIe port 491 is an example of a module port. The boot control section 471 may be, e.g., a hardware circuit or a microcomputer. The FPGA processor 450 is a processor (e.g., a CPU) of the FPGA 152. The link control register 455 is a register in which a value indicating whether a state between the PCIe-SW 122 and an upstream PCIe port 401U described later is brought into a link-up state or a link-down (non-link-up) state is set.

The plurality of PCIe ports 401 include one or more (e.g., one) upstream PCIe port 401U and one or more (e.g., two) downstream PCIe ports 401D. The upstream PCIe port 401U is the PCIe port 401 coupled to an upstream apparatus (the storage controller 112 in the present embodiment). The downstream PCIe port 401D is the PCIe port 401 coupled to a downstream apparatus (the SSD 111 in the present embodiment).

The PCIe port 411A (an example of a downstream device port) of the PCIe-SW 122 is coupled to a downstream PCIe port 401D1 and, similarly, the PCIe port 411B (an example of a downstream device port) of the PCIe-SW 122 is coupled to a downstream PCIe port 401D2. The PCIe port 411C (an example of an upstream device port) of the PCIe-SW 122 is coupled to the upstream PCIe port 401U. The PCIe port 411D (an example of a first device port) of the PCIe-SW 122 is coupled to the PCIe port 491 (an example of a first module port) of the FPGA 152. With the coupling configuration described above, the I/O-target data is transferred between the main storage memory 123 of the storage controller 112 and the cryptographic module memory 151 of the cryptographic module 150, and is also transferred between the cryptographic module memory 151 of the cryptographic module 150 and the SSD 111 via the PCIe-SW 122. In the case where the encryption or decryption of the I/O-target data is unnecessary, the I/O-target data may be transferred between the main storage memory 123 of the storage controller 112 and the SSD 111 via the PCIe-SW 122 (without interposition of the cryptographic module 150).

The first flash memory 40 stores configuration data 42, a boot image 43, a boot cyclic redundancy check (CRC) 44, a main image 45, and a main CRC 46. The FPGA 152 is configured based on the configuration data 42. The boot image 43 is image data of boot firmware (FW) 451 of the FPGA 152. The boot CRC 44 is a CRC code of the boot image 43. The main image 45 of the FPGA 152 is image data of main FW 452. The main CRC 46 is a CRC code of the main image 45. One or both of the boot FW 451 and the main FW 452 are examples of first software (e.g., first firmware (FW)). The CRC code is an example of an error detection code (EDC).

In the FPGA 152, the boot control section 471 loads the configuration data 42 and a configuration CRC (a CRC code of the configuration data 42 (not shown)), and verifies the configuration data 42 by using the configuration CRC. When the configuration data 42 is normal, the FPGA 152 is configured based on the configuration data 42. The boot control section 471 loads the boot CRC 44 and the boot image 43, and verifies the boot image 43 by using the boot CRC 44. When the boot image 43 is normal, the FPGA processor 450 executes the boot FW 451. The boot FW 451 has a FW load section 461. The FW load section 461 loads the main CRC 46 and the main image 45, and verifies the main image 45 by using the main CRC 46. When the main image 45 is normal, the FPGA processor 450 executes the main FW 452. The main FW 452 has a known-answer test section 481, an EDC check section 482, and a link control section 483. Each of the known-answer test section 481, the EDC check section 482, and the link control section 483 will be described later.

The second flash memory 30 stores a boot image 33, a boot CRC 34, a main image 35, and a main CRC 36. The boot image 33 is image data of boot FW 421 of the PCIe-SW 122. The boot CRC 34 is a CRC code of the boot image 33. The main image 35 is image data of main FW 422 of the PCIe-SW 122. The main CRC 36 is a CRC code of the main image 35. One or both of the boot FW 421 and the main FW 422 are examples of second software (e.g., second firmware (FW)). In the present embodiment, the boot FW 421 is an example of the second software.

In the PCIe-SW 122, the boot control section 431 loads the boot image 33 into the PSW processor 420. With this, the PSW processor 420 executes the boot FW 421. The boot FW 421 includes a FW load section 441. The FW load section 441 loads the main CRC 36 and the main image 35, and verifies the main image 35 by using the main CRC 36. When the main image 35 is normal, the PSW processor 420 executes the main FW 422.

One of states of the PCIe-SW 122 is a reset state. In the case where the PCIe-SW 122 is in the reset state, each of at least one of the PCIe-ports 411A to 411C, and the PCIe port 411D is in a state in which data input/output is not allowed. Specifically, for example, in the present embodiment, the reset state of the PCIe SW 122 means a state in which the link-up between the PCIe port 411C and the upstream PCIe port 401U is not established. In the state in which the link-up between the PCIe port 411C and the upstream PCIe port 401U is not established, it is not possible to perform communication at the PCIe ports 411A, 411B, and 411D. When the link-up between the PCIe port 411C and the upstream PCIe port 401U is established (i.e., the reset state is terminated), data input/output is allowed at each of the PCIe ports 411A, 411B, and 411D. Note that, in the state in which the link-up between the PCIe port 411C and the upstream PCIe port 401U is not established, data input/output is not allowed at the PCIe port 411D, but data input/output is allowed at the I2C port 412.

According to the cryptographic apparatus 128 illustrated in FIG. 2, the cryptographic apparatus 128 has the following configuration.

By adding the FPGA 152 to an existing circuit board on which the PCIe-SW 122 is mounted, a cryptographic apparatus vendor can manufacture the cryptographic apparatus 128 more easily than when the existing circuit board is not used.

In addition, it is considered that, as the size of a cryptographic boundary becomes smaller (as the number of components present in a cryptographic boundary becomes smaller), it becomes easier to satisfy a certification requirement.

However, according to Level 2 of FIPS 140 certification, the entire physical device corresponds to the cryptographic boundary. It is difficult to physically separate the cryptographic apparatus 128 (specifically, physically separate the existing circuit board) in order to reduce the size of the cryptographic boundary which complies with the requirement of Level 2 of FIPS 140 certification.

In addition, the PCIe-SW 122 on the existing circuit board does not have the function of performing an FIPS self-test including verification which satisfies the requirement of Level 2 of FIPS 140 certification on at least part of the boot image 33 and the main image 35 loaded into the PCIe-SW 122. For example, in the present embodiment, the PCIe-SW 122 does not have the function of performing the FIPS self-test on the entire boot image 33.

In addition, according to the requirement of Level 2 of FIPS 140 certification, a main element which performs the FIPS self-test including verification of software does not need to be a device which executes the software. In other words, even when an element other than the device which executes the software performs the FIPS self-test including the verification of the software, it is possible to satisfy the requirement of Level 2 of FIPS 140 certification.

In the present embodiment, the cryptographic module 150 executes the verification of the boot image 33. The boot image 33 is an example of a verification target. Specifically, the boot image 33 is, e.g., an example of image data of software which is not verified by a device which executes the software. With this, it is possible to set the entire cryptographic apparatus 128 including the circuit board provided with the PCIe-SW 122 which does not have the function of performing the FIPS self-test as the cryptographic boundary.

Specifically, in the present embodiment, the configuration data 42 and the main image 45 are added to the existing circuit board on which the PCIe-SW 122 is mounted. The configuration data 42 is loaded into the FPGA 152 (an example of a programmable device) and the FPGA 152 is thereby configured. The main image 45 is executed by the FPGA 152 and the main FW 452 is thereby implemented. The main FW 452 has the function of performing the verification of the boot image 33 (an example of second assurance check processing). With this, the cryptographic module 150 can execute the verification of the boot image 33 and, consequently, it is possible to include the PCIe-SW 122 which does not have the function of performing the FIPS self-test on the boot image 33 in the cryptographic boundary. Note that the PCIe-SW 122 may be an example of a product provided by a vendor different from the vendor of the cryptographic apparatus 128.

In the present embodiment, in order to verify the boot image 33, the boot CRC 34 which is the CRC code of the boot image 33 is added to the second flash memory 30 (the boot CRC 34 may also be added to a storage area other than the second flash memory 30 (e.g., the first flash memory 40)). The EDC check section 482 reads (loads) the boot CRC 34 and the boot image 33 from the second flash memory 30, and verifies the boot image 33 by using the boot CRC 34. Specifically, in the FPGA 152, after the FW load section 461 of the boot FW 451 completes the verification of the main image 45 (first assurance check processing) by using the main CRC 46, the EDC check section 482 of the main FW 452 verifies the boot image 33 by using the boot CRC 34. That is, after the main FW 452 passes the FIPS self-test, the main FW 452 having passed the FIPS self-test performs the FIPS self-test on the boot image 33 of the PCIe-SW 122. With this, it is possible to efficiently perform the verification for satisfying the requirement of Level 2 of FIPS 140 certification. Note that the verification of the boot image 33 which uses the boot CRC 34 (and/or another verification which uses the CRC) may be performed by a hardware circuit of the cryptographic module 150.

With regard to the FPGA 152, the boot CRC 44 is the CRC code which is expected to be calculated based on the boot image 43, and the main CRC 46 is the CRC code which is expected to be calculated based on the main image 45. The verification of the boot image 43 includes checking whether or not the CRC code calculated based on the boot image 43 conforms to the boot CRC 44. The verification of the main image 45 includes checking whether or not the CRC code calculated based on the main image 45 conforms to the main CRC 46. Similarly, with regard to the PCIe-SW 122, the boot CRC 34 is the CRC code which is expected to be calculated based on the boot image 33. The verification of the boot image 33 includes checking whether or not the CRC code calculated based on the boot image 33 conforms to the boot CRC 34. Such a boot CRC 34 is added to the second flash memory 30 (may also be added to the first flash memory 40 instead of the second flash memory 30). With this, the cryptographic module 150 can perform the verification of the boot image 33 of the PCIe-SW 122.

Figure 3:
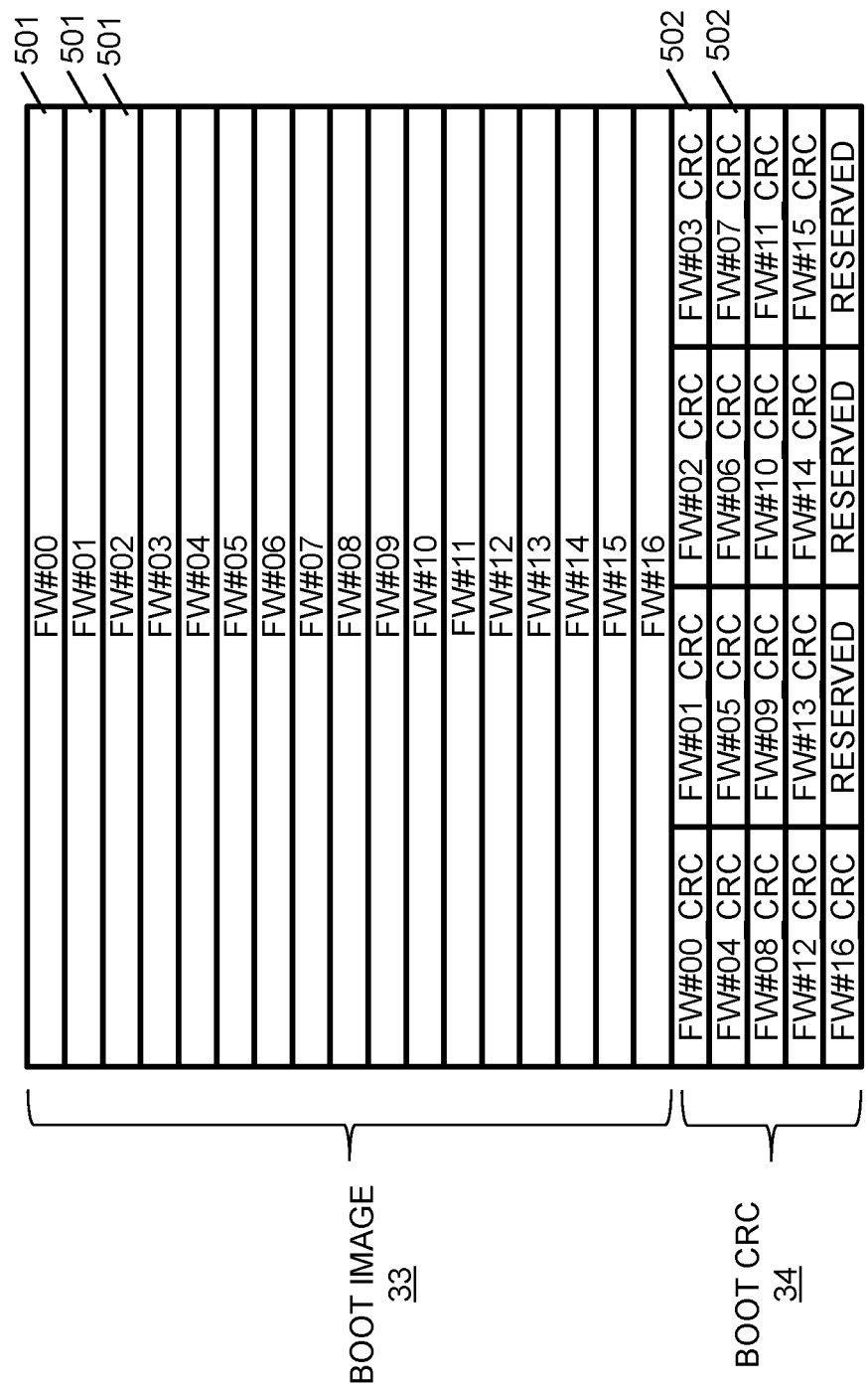
FIG. 3 shows the configuration of each of a boot image and a boot CRC of a PCIe-SW.

In the present embodiment, as shown in FIG. 3, the boot image 33 is constituted by a plurality of boot image fragments 501. The boot CRC 34 is constituted by a plurality of CRC codes 502 which are expected to correspond to the plurality of boot image fragments 501 respectively. That is, for each boot image fragment 501, the CRC code 502 which is expected to be calculated from the boot image fragment 501 is prepared. The CRC code 502 is an example of a second assurance code. In the FPGA 152, the EDC check section 482 executes, for each boot image fragment 501, calculating a CRC code based on the boot image fragment 501 and checking whether or not the CRC code conforms to the CRC code 502 corresponding to the boot image fragment 501. Thus, in the present embodiment, in the verification of the boot image 33, the verification is performed for each boot image fragment 501. With this, in the case where part of the boot image 33 has an abnormality, it is possible to detect the abnormality without performing the verification on the entire boot image 33. Note that the size of each of the plurality of CRC codes 502 is a size which satisfies a size requirement (16 bits or more) specified in the requirement of Level 2 of FIPS 140 certification.

The verification performed for each boot image fragment 501 contributes to a reduction in time period required to perform processing resumption from module reset which is reset of the cryptographic module 150. Specifically, for example, in the case where the module reset is executed after completion of verification of the entire boot image 33, according to the requirement of FIPS 140 certification, it is necessary to verify the boot image 33 again. However, the verification of the entire boot image 33 is not necessary. In the present embodiment, as described above, the boot image 33 and the boot CRC 34 are fragmented. In the case where the module reset is executed, the EDC check section 482 executes, as for a boot image fragment 501 (e.g., a leading boot image fragment 501) constituting part of the plurality of boot image fragments 501, calculating a CRC code and checking whether or not the CRC code conforms to the CRC code 502 corresponding to the boot image fragment 501. With this, it is possible to perform the processing resumption from the module reset in a short time period.

In addition, the verification performed for each boot image fragment 501 contributes to avoidance of a reduction in the speed of the verification of the boot image 33. Specifically, the EDC check section 482 reads the boot image 33 and the boot CRC 34 via the PCIe-SW 122, but cannot read the boot image 33 and the boot CRC 34 via the PCIe port 491. This is because, given the requirement of Level 2 of FIPS 140 certification, it is necessary to bring each of the downstream PCIe ports 401D1 and 401D2 into the state in which data input/output is not allowed while the verification of the boot image 33 is not completed and, in the present embodiment, a state in which the link-up between the upstream PCIe port 401U and the PCIe port 411C is not established is maintained while a power-up test (an example of a series of tests) including the verification of the boot image 33 is not completed and, as a result, the PCIe port 411D in brought into the state in which data input/output is not allowed. Accordingly, in order to read the boot image 33 and the boot CRC 34, a bus lower in speed than a bus between the PCIe port 491 and the PCIe port 411D, specifically, a bus between the I2C ports 492 and 412 has to be used. To cope with this, in the present embodiment, as described above, both of the boot image 33 and the boot CRC 34 are fragmented. The EDC check section 482 reads the boot image fragment 501 and the CRC code 502 via the bus between the I2C ports 492 and 412 for each boot image fragment 501. With this, it is possible to avoid a reduction in the speed of the verification of the boot image 33. Note that the "power-up test" is one of tests serving as the requirement of FIPS 140 certification. The cryptographic apparatus 128 has to automatically execute the present test at power-up.

In the present embodiment, the cryptographic module 150 controls maintaining the state in which the link-up between the upstream PCIe port 401U and the PCIe port 411C is not established while the verification of the boot image 33 is not completed. With this, it is possible to maintain each of the downstream PCIe ports 401D1 and 401D2 in the state in which data input/output is not allowed while the verification of the boot image 33 is not completed, and it is thereby possible to contribute to satisfaction of the requirement of Level 2 of FIPS 140 certification.

Specifically, in the present embodiment, the link control register 455 and the device reset line 456 are provided. The link control register 455 is provided in the FPGA 152. As described above, the link control register 455 is the register in which a link-up value (a value meaning link-up) or a link-down value (a value meaning link-down) is set. The device reset line 456 is a signal line extending from the link control register 455, and is coupled to the PCIe port 411C to which the upstream PCIe port 401U is coupled. The device reset line 456 is the signal line in which a signal meaning the value set in the link control register 455 (an example of a signal indicating whether the reset state of the PCIe-SW 122 is maintained or terminated) flows. The PCIe-SW 122 is configured so as not to establish the link-up between the PCIe port 411C and the upstream PCIe port 401U while the signal meaning the link-down value is input to the PCIe port 411C. The PCIe-SW 122 is configured so as to establish the link-up between the PCIe port 411C and the upstream PCIe port 401U in the case where the signal meaning the link-up value is input to the PCIe port 411C. The link-down value is set in the link control register 455 initially (by the FPGA 152 (e.g., the boot control section 471), e.g., on the activation of the FPGA 152). Consequently, even when the main FW 422 of the PCIe-SW 122 becomes ready to start, while the signal meaning the link-down value is input to the PCIe port 411C, the link-up between the PCIe port 411C and the upstream PCIe port 401U is not established. In other words, the cryptographic module 150 maintains the state in which the link-up between the PCIe port 411C and the upstream PCIe port 401U is not established via the device reset line 456 until the power-up test is completed. Specifically, the link control section 483 maintains the value of the link control register 455 at the link-down value until the power-up test is completed. Thus, the cryptographic module 150 can maintain the state in which the link-up between the PCIe port 411C and the upstream PCIe port 401U is not established until the power-up test is completed, and it is thereby possible to contribute to satisfaction of the requirement of Level 2 of FIPS 140 certification. In the case where the power-up test is completed, the link control section 483 changes the value in the link control register 455 to the link-up value.

Figure 4:
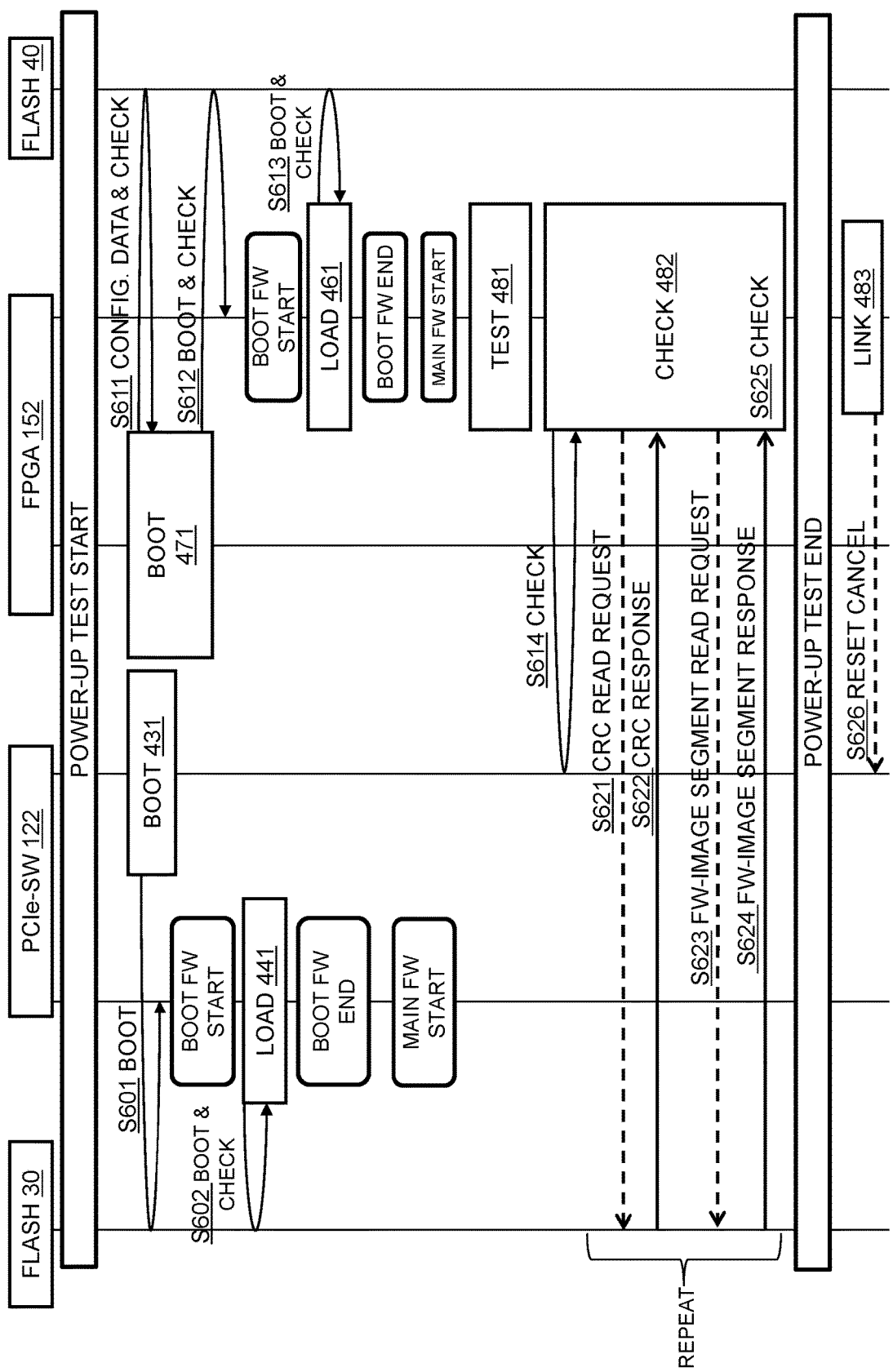
FIG. 4 shows the procedure of a power-up test.

FIG. 4 shows the procedure of the power-up test.

When the power-up test is started, the PCIe-SW 122 and the FPGA 152 are concurrently activated.

The activation of the PCIe-SW 122 is as follows. That is, the boot control section 431 loads the boot image 33 into the PSW processor 420 (S601). With this, the PSW processor 420 starts the boot FW 421. The FW load section 441 of the boot FW 421 loads the main CRC 36 and the main image 35 from the second flash memory 30, and verifies the main image 35 by using the main CRC 36. When the main image 35 is normal, in the PSW processor 420, the boot FW 421 is ended and the main FW 422 is started. Even when the main FW 422 is brought into a start state, the link-up between the PCIe port 411C and the upstream PCIe port 401U is not established. This is because the link-down value is set in the link control register 455 (the reset state of the PCIe-SW 122 is maintained) by the FPGA 152 which is activated concurrently with the PCIe-SW 122.

The activation of the FPGA 152 is as follows.

That is, the PCIe-SW 122 is maintained in the reset state by setting the initial value of the link control register 455 to the link-down value. The boot control section 471 loads the configuration data 42 and the above-described configuration CRC, and verifies the configuration data 42 by using the configuration CRC (S611). When the configuration data 42 is normal, the FPGA 152 is configured based on the configuration data 42. The boot control section 471 loads the boot CRC 44 and the boot image 43, and verifies the boot image 43 by using the boot CRC 44 (S612). When the boot image 43 is normal, in the FPGA processor 450, the boot FW 451 is started. The FW load section 461 of the boot FW 451 loads the main CRC 46 and the main image 45, and verifies the main image 45 by using the main CRC 46 (S613). When the main image 45 is normal, in the FPGA processor 450, the boot FW 451 is ended and the main FW 452 is started.

The known-answer test section 481 of the main FW 452 performs a known-answer test (e.g., a test concerning whether or not expected output is obtained when given input is performed on a cryptographic algorithm). Note that, in the case where the above-described module reset is performed and processing is resumed, the processing may be started from the known-answer test.

When the known-answer test is completed, the EDC check section 482 executes, for each boot image fragment 501, calculating a CRC code based on the boot image fragment 501 and checking whether or not the CRC code conforms to the CRC code 502 corresponding to the boot image fragment 501. Specifically, for example, the following is implemented.

(S621) The EDC check section 482 transmits a read request of a CRC code 502 (e.g., a leading CRC code 502) which is one of unread CRC codes 502 to the second flash memory 30.

(S622) In response to the read request transmitted in S621, the EDC check section 482 receives the CRC code 502 corresponding to the read request.

(S623) The EDC check section 482 transmits a read request of a boot image fragment 501 (e.g., a leading boot image fragment 501) which is one of unread boot image fragments 501 to the second flash memory 30.

(S624) In response to the read request transmitted in S623, the EDC check section 482 receives the boot image fragment 501 corresponding to the read request.

(S625) The EDC check section 482 calculates a CRC code based on the boot image fragment 501 received in S624, and checks whether the CRC code conforms to the CRC code 502 received in S622.

In the case where the result of the check in S625 is negative, the power-up test stops (ends abnormally). In the case where a negative result is obtained not only in the verification of the boot image 33 but also in any verification in the power-up test (the verification of the main image 35, the verification of the boot image 43, or the verification of the main image 45), the power-up test stops.

When the result of the check in S625 is affirmative and the unread CRC code 502 is present, the processing returns to S621.

When the result of the check in S625 is affirmative and the unread CRC code 502 is not present, the power-up test ends (ends normally).

Thereafter, the link control section 483 terminates the reset state of the PCIe-SW 122 (S626). Specifically, the link control section 483 changes the value set in the link control register 455 to the link-up value.

While the embodiment has been described thus far, the embodiment merely represents an example for illustrating the present invention, and it is to be understood that the scope of the present invention is not limited to the embodiment. The present invention can be implemented in various other modes. For example, the present invention can also be applied to obtainment of certification other than FIPS 140 certification.

We claim:

1. A cryptographic apparatus receiving encryption-target data and encrypting the data, the cryptographic apparatus comprising:
a first storage area in which image data of first software is stored;
a cryptographic module which encrypts data by executing the first software;
a second storage area in which image data of second software is stored; and
a device which executes predetermined processing by executing the second software,
wherein the cryptographic module executes:
first assurance check processing, which is processing for satisfying a predetermined certification requirement, on the image data of the first software, and
second assurance check processing, which is processing for satisfying the predetermined certification requirement, on a verification target which is at least part of the image data of the second software and on which verification for satisfying the predetermined certification requirement is not performed by the device,
wherein
the first storage area stores first assurance data which is expected to be calculated based on the image data of the first software,
the first assurance check processing includes calculating assurance data on the basis of the image data of the first software and checking whether or not the assurance data conforms to the first assurance data,
the second assurance check processing includes calculating assurance data on the basis of the verification target and checking whether or not the assurance data conforms to second assurance data which is expected to be calculated based on the verification target, and
the second assurance data is stored in the first storage area or the second storage area.

2. The cryptographic apparatus according to claim 1, wherein
the cryptographic module executes the second assurance check processing after the execution of the first assurance check processing is completed.

3. The cryptographic apparatus according to claim 1, wherein
the verification target is constituted of a plurality of verification target fragments,
the second assurance data is constituted of a plurality of second assurance codes which are expected to correspond to the plurality of verification target fragments respectively,
the cryptographic module executes, in the second assurance check processing, calculating, for each of the verification target fragments, an assurance code on the basis of the verification target fragment and checking whether or not the assurance code conforms to the second assurance code corresponding to the verification target fragment, and a size of each of the plurality of second assurance codes is a size which satisfies a size requirement specified in the predetermined certification requirement.

4. The cryptographic apparatus according to claim 3, wherein in a case where a module reset, which is a reset of the cryptographic module, is executed after execution of the second assurance check processing on the entirety of the verification target is completed, the cryptographic module executes, as processing for satisfying the predetermined certification requirement, calculating an assurance code and checking whether or not the assurance code conforms to the second assurance code corresponding to the verification target fragment, as for a verification target fragment which is part of the plurality of verification target fragments.

5. The cryptographic apparatus according to claim 3, wherein the device has a first device port, which is a port coupled to a first bus, and a second device port, which is a port coupled to a second bus, not to the first bus, the cryptographic module has a first module port, which is a port coupled to the first bus, and a second module port, which is a port coupled to the second bus, in a case where the execution of the second assurance check processing is not completed, a state of the first device port is a state in which data input/output is not possible, while a state of the second device port is a state in which data input/output is possible, and the cryptographic module reads, for each verification target fragment, the verification target fragment and the second assurance code via the second bus in the second assurance check processing.

6. The cryptographic apparatus according to claim 1 further comprising:

an upstream apparatus port, which is an upstream port; and a downstream apparatus port, which is a downstream port, wherein the device has an upstream device port, which is a port coupled to a bus to which the upstream apparatus port is coupled, and a downstream device port, which is a port coupled to a bus to which the downstream apparatus port is coupled, in a case where the device is in a reset state, a state of at least one of the upstream device port and the downstream device port is a state in which data input/output is not possible, in a case where the reset state of the device is cancelled, the state of each of the upstream device port and the downstream device port can transition to a state in which data input/output is possible, and the cryptographic module maintains the reset state of the device until a series of tests including the second assurance check processing are completed.

7. The cryptographic apparatus according to claim 6 further comprising a device reset line, which is a signal line in which a signal indicating whether the reset state of the device is maintained or cancelled flows, and which connects the cryptographic module and the device, wherein the cryptographic module maintains the reset state of the device via the device reset line until the series of tests are completed.

8. The cryptographic apparatus according to claim 1, wherein the predetermined certification requirement is a requirement of Level 2 of FIPS 140 certification, and configuration data which is loaded into a programmable device and the image data of the first software, which performs the second assurance check processing by being executed by the programmable device into which the configuration data is loaded, are added to an existing circuit board on which the device has been mounted.

9. A storage system comprising:

a persistent storage device;

a storage controller; and the cryptographic apparatus according to claim 1 which is coupled to the persistent storage device and the storage controller, wherein the storage controller transmits write-target data for the persistent storage device and a cryptographic key of the data, the cryptographic apparatus receives the data and the cryptographic key and encrypts the data by using the cryptographic key, and the encrypted data is transferred to the persistent storage device.

* * * * *